US012610965B2

(12) United States Patent
Marmolejo et al.

(10) Patent No.: US 12,610,965 B2
(45) Date of Patent: *Apr. 28, 2026

(54) PARTICULATE COMPOSITION CONTAINING CO-CRYSTAL OF MALIC ACID AND ALKALI METAL HYDROGEN MALATE

(71) Applicant: Purac Biochem B.V., Gorinchem (NL)

(72) Inventors: Cynthia Berenice Marmolejo, Gorinchem (NL); Marija Orlovic, Gorinchem (NL); Hai Ling Hazeline Neo, Gorinchem (NL); Dirkje Houwelingen-de Jong, Gorinchem (NL); Willy Gijsberta Cornelia van Arendonk, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 234 days.

This patent is subject to a terminal disclaimer.

(21) Appl. No.: 18/211,123

(22) Filed: Jun. 16, 2023

(65) Prior Publication Data

US 2023/0329278 A1      Oct. 19, 2023

Related U.S. Application Data

(63) Continuation of application No. PCT/EP2021/085727, filed on Dec. 14, 2021.

(30) Foreign Application Priority Data

Dec. 17, 2020      (EP) .................................... 20215219

(51) Int. Cl.
| | |
|---|---|
| *A23G 3/36* | (2006.01) |
| *A23G 3/34* | (2006.01) |
| *A23G 3/54* | (2006.01) |

(52) U.S. Cl.
CPC ............... *A23G 3/36* (2013.01); *A23G 3/343* (2013.01); *A23G 3/54* (2013.01)

(58) Field of Classification Search
CPC .......... A23G 4/06; A23G 4/062; A23G 4/046; A23G 3/343; A23G 3/36; A23G 4/025;
(Continued)

(56) References Cited

U.S. PATENT DOCUMENTS

| | | |
|---|---|---|
| 5,445,837 A | 8/1995 | Burkes et al. |
| 2007/0231455 A1 | 10/2007 | Bontenbal |
| 2008/0014312 A1 | 1/2008 | Notebaart et al. |

FOREIGN PATENT DOCUMENTS

| | | |
|---|---|---|
| CN | 1085744 A | 4/1994 |
| EP | 1 839 494 A1 | 10/2007 |
| JP | 2019-505237 A | 2/2019 |
| WO | WO-2008/006878 A1 | 1/2008 |
| WO | WO-2017/144486 A1 | 8/2017 |
| WO | WO-2018/215372 A1 | 11/2018 |

(Continued)

OTHER PUBLICATIONS

"PURAC Powder MA", Corbion, Mar. 7, 2017.
(Continued)

*Primary Examiner* — Subbalakshmi Prakash
(74) *Attorney, Agent, or Firm* — Foley & Lardner LLP; Sunit Talapatra

(57) ABSTRACT

The present invention relates to a particulate composition having a volume weighted average diameter $D_{4,3}$ of 20-180 µm and comprising at least 50 wt. % of malate particles, said malate particles comprising at least 70 wt. % of co-crystal of malic acid and alkali metal hydrogen malate.
The particulate composition is advantageously applied in or onto confectionery products.

15 Claims, 1 Drawing Sheet

(58) Field of Classification Search
CPC ........ A23G 3/54; A23G 1/32; A23G 2200/00;
C07C 59/245; C07C 51/43; C07B
2200/13
USPC .......................................................... 426/89
See application file for complete search history.

(56) References Cited

FOREIGN PATENT DOCUMENTS

| WO | WO-2019/063623 A1 | 4/2019 |
| WO | WO-2019/115733 A1 | 6/2019 |
| WO | WO-2020/260194 A1 | 12/2020 |

OTHER PUBLICATIONS

Fleck et al., "Dielectric and Pyroelectric Properties of Lithium Hydrogen Dimalate, LiH3 (C4 H4 o5) 2", Z. Naturforsch, vol. 41a, 1986, pp. 1289-1296.

Van Havere et al., "Crystal structure of bis(potassium hydrogen L-malate) 9 malic acid, 2 [K (C4H5O5)-] 9 C4H6O5", Journal of Crystallographic and Spectroscopic Research, vol. 15, No. 1, 1985, pp. 45-52.

Anonymous, Corbion Purac, "PURAC Powder MA", PURAC, XP055426983, Mar. 7, 2017, retrieved from http://www.corbion.com/static/downloads/datasheets/359pcs/PDS-PURAC PowderMA.pdf on Nov. 20, 2017, 1 page.

Anonymous, Corbion Purac, "Unleash the power of sour—PURAC Powder acid sanding in soft confectionery", PURAC, XP055426600, Apr. 20, 2016, retrieved from https://web.archive.org/web/20160420044323/http://www.corbion.com/base/DownloadHelper/Download.File/9727 on Nov. 20, 2017, 2 pages.

Fleck et al., "Dielectric and Pyroelectric Properties of Lithium Hydrogen Dimalate, $LiH_3(C_4H_4O_5)_2$.", Zeitschrift für Naturforschung A, vol. 41, Issue 11, pp. 1289-1296, Nov. 1986.

International Search Report and Written Opinion on PCT Appl. Ser. No. PCT/EP2021/085727 dated Apr. 7, 2022 (13 pages).

Van Havere et al., "Crystal structure of bis(potassium hydrogen L-malate) malic acid, $2[K^+(C_4H_5O_5)-] \bullet C_{4H5}O_5$" Journal of Crystallographic and Spectroscopic Research, vol. 15, No. 1, (1985), pp. 45-52.

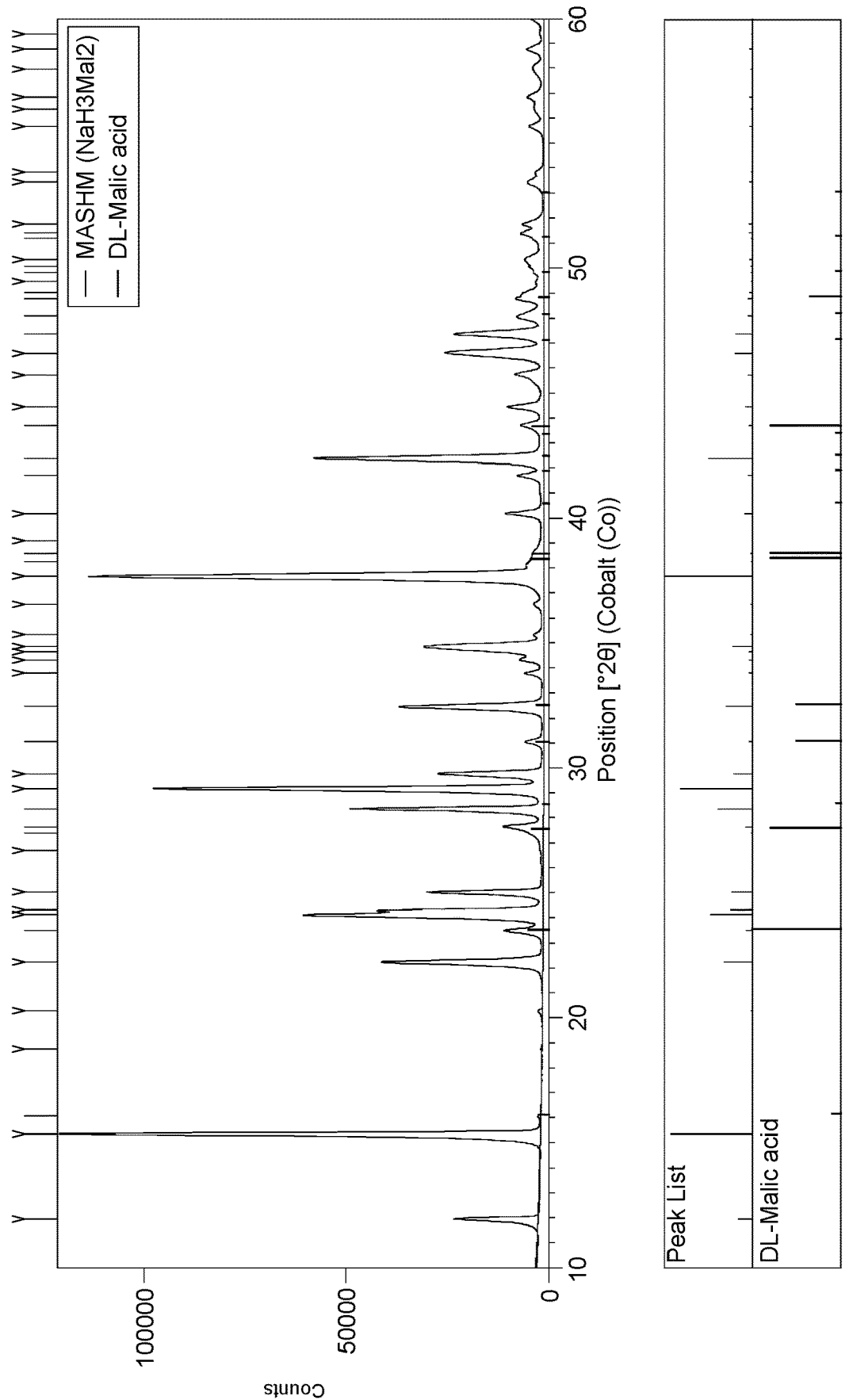

PARTICULATE COMPOSITION CONTAINING CO-CRYSTAL OF MALIC ACID AND ALKALI METAL HYDROGEN MALATE

CROSS-REFERENCE TO RELATED APPLICATIONS

This application is a continuation of International Patent Application No. PCT/EP2021/085727 filed Dec. 14, 2021, which application claims priority to European Patent Application No. 20215219.5 filed Dec. 17, 2020, the contents of which are all incorporated herein by reference in their entireties.

TECHNICAL FIELD OF THE INVENTION

The present invention relates to a particulate composition comprising malate particles that comprise least 70 wt. % of co-crystal of malic acid and alkali metal hydrogen malate. The invention further provides a method of preparing such a particulate composition.

The particulate composition of the present invention may advantageously be applied in or onto confectionery products, notably in hard and soft panned coatings, tabletted candies and chocolate.

BACKGROUND OF THE INVENTION

Malic acid (2-Hydroxybutanedioic acid) is the main acid in many fruits, including apricots, blackberries, blueberries, cherries, grapes, mirabelles, peaches, pears, plums, and quince and is present in lower concentrations in other fruits, such as citrus. It also contributes to the sourness of green (unripe) apples. The taste of malic acid is very clear and pure in rhubarb, a plant for which it is the primary flavour substance. Malic acid is used as a food additive in noncarbonated drinks, wines, confectioneries, chewing gum, desserts and baked goods.

Sugar panning, or simply panning, is a method for adding a candy "shell" to candy or nuts. Popular candies that employ this process in their manufacture include dragées, M&M's, gobstoppers, konpeitō and jelly beans. Jelly beans use soft panning while the other three are examples of hard panning.

Hard and soft panning both are made in a similar fashion, but with different ingredients and at different speeds. Hard panning is a process in which a thin coat of a sugar or sugar alcohol solution is applied to individual tumbling cores, followed by evaporation of the moisture so that the sugar or sugar alcohol crystallizes in a thin layer. This process is repeated until the desired thickness of hard coating is obtained. Any material that will not deform under its own weight and will tumble freely (no flat surfaces that may stick together) is a candidate for hard panning. Soft panning uses a syrup that will not crystallize, such as glucose. To assist in drying, powdered sugar or caster sugar is added during the tumble.

WO 2019/063623 describes a particulate acidulant composition comprising 20-70 wt. % malic acid, 3-40 wt. % lactic acid and 0-40 wt. % of food acid selected from citric acid, fumaric acid, adipic acid, tartaric acid and acetic acid and combinations thereof, wherein the acidulant composition comprises:

40-90 wt. % of M-particles comprising co-crystal of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid;

5-60 wt. % of L-particles comprising co-crystal of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized carboxylic acid; and wherein the combination of M-particles and L-particles constitutes at least 50 wt. % of the acidulant composition.

The Examples of the aforementioned international patent application describe powder blends comprising 80 wt. % of PURAC Powder MA (42-50 wt. % sodium hydrogen malate and 50-58 wt. % malic acid), produced in a fluid bed dryer by spraying an aqueous solution of partially neutralized malic acid onto a bed of malic acid particles. PURAC Powder MA typically contains 40-50 wt. % of co-crystal of malic acid and sodium hydrogen malate.

WO 2020/260194 describes a particulate composition comprising at least 1 wt. % of malate particles, said malate particles having a diameter of 50-1000 μm and comprising at least 70 wt. % of co-crystal of malic acid and alkali metal hydrogen malate.

Van Havere et al. (*Crystal structure of bis(potassium hydrogen L-malate)·malic acid*, $2[K^+(C_4H_5O_5)^-]\cdot C_4H_6O_5$, Journal of Crystallographic and Spectroscopic Research (1985), 15(1), 45-52) describe the crystal structure of bis (potassium hydrogen L-malate)·malic acid.

Fleck et al. (*Dielectric and Pyroelectric Properties of Lithium Hydrogen Dimalate*, $LiH_3(C_4H_4O_5)_2$. Z. Naturforsch. 41a, 1289-1296 (1986); received Jul. 5, 1986) describe how $LiH_3(C_4H_4O_5)_2$ was prepared from an aqueous solution containing stoichiometric amounts of LiOH and malic acid (1:2). Large single crystals (15×8×6 mm) could be grown by slow evaporation of $H_2O$ from the aqueous solution at 290 K.

SUMMARY OF THE INVENTION

The inventors have developed a malate powder that can suitably be applied in and onto confectionery products to impart acidic flavour notes. The malate powder is composed of particles comprising at least 70 wt. % of co-crystal of malic acid and alkali metal hydrogen malate.

Accordingly, a first aspect of the present invention relates to a particulate composition having a volume weighted average diameter $D_{4,3}$ of 20-180 μm and comprising at least 50 wt. % of malate particles, said malate particles comprising at least 70 wt. % of co-crystal of malic acid and alkali metal hydrogen malate. Examples of such a co-crystal include sodium hydrogen malate·malic acid ($Na^+$ $(C_4H_5O_5)^-\cdot C_4H_6O_5$) and bis(potassium hydrogen L-malate)·malic acid and dipotassium tetrahydrogen trimalate ($2[K^+(C_4H_5O_5)^-]\cdot C_4H_6O_5$).

The particulate composition of the present invention is advantageously applied in or onto confectionery products in such a way that the malate particles remain largely intact. Although the inventors do not wish to be bound by theory, it is believed that when malate particles come into contact with saliva the co-crystal of malic acid and alkali metal hydrogen malate instantly dissociates into malate$^{2-}$ or hydrogen malate$^-$, $Na^+/K^+$ and $H^+$. Thus, the smooth tart flavour of malic acid is immediately released upon consumption of confectionery products that contain the malate particles of the present invention.

The malate powder of the present invention offers the advantage that it remains free flowing even at high temperatures and high humidity and that the composition of the malate particles does not vary with particle size. Thus, the malate powder can be provided in the form of a fine powder by milling a coarse malate powder to the desired particle size.

A second aspect of the invention relates to a method of preparing a pulverised malate powder, said method comprising:

providing a coarse malate powder containing at least 90 wt. % of malate particles comprising at least 70 wt. % of co-crystal of malic acid and alkali metal hydrogen malate, said coarse malate powder having a volume weighted average diameter $D_{4,3}$ of at least 100 μm;
    reducing the particle size of the coarse malate powder to produce a pulverised malate powder having a volume weighted average diameter $D_{4,3}$ that is at least 50% lower than that of the coarse malate powder.

A third aspect of the invention relates to a confectionery product comprising at least one of:

a hard panned or soft panned coating containing 0.1-6 wt. % of malate particles;
    a tabletted candy containing at least 0.1-50 wt. % of malate particles
    chocolate containing at least 0.1-30 wt. % of malate particles;

wherein the malate particles contain at least 70 wt. % of co-crystal of malic acid and alkali metal hydrogen malate.

A fourth aspect of the invention relates to a process of preparing a hard panned confection, said process comprising:

providing a cohesive edible core;
    applying at least one coating layer of syrup onto said edible core, said syrup comprising crystallisable sweetener selected from crystallisable sugars, crystallisable sugar alcohols and combinations thereof; and
    applying at least one other coating layer comprising malate particles containing at least 70 wt. % of co-crystal of malic acid and alkali metal hydrogen malate.

BRIEF DESCRIPTION OF THE DRAWINGS

FIG. 1, is an X-ray diffraction pattern of a co-crystal of malic acid and sodium hydrogen malate, identified as sodium trihydrogen dimalate ($Na^+(C_4H_5O_5)^-·C_4H_6O_5$.).

DETAILED DESCRIPTION OF THE INVENTION

In a first aspect, the present invention relates to a particulate composition having a volume weighted average diameter $D_{4,3}$ of 20-180 μm and comprising at least 50 wt. % of malate particles, said malate particles comprising at least 70 wt. % of co-crystal of malic acid and alkali metal hydrogen malate.

The term "malate" as used herein refers to malic acid, salts of malic acid and combinations thereof.

The term "co-crystal" as used herein refers to a crystalline single phase material composed of two or more different molecular or ionic compounds in a stoichiometric ratio, which are neither solvates nor simple salts.

The term "sugar" as used herein refers to sweet tasting monosaccharides and disaccharides.

The term "sugar alcohol" as used herein refers to sweet tasting polyol that is not a sugar and that contains 6-12 carbon atoms.

The term "syrup" as used herein refers to thick, viscous liquid consisting primarily of a solution of sugar and/or sugar alcohol in water.

The term "crystallisable" as used herein in relation to sugars or sugar alcohols refers to the ability of the sugar or sugar alcohol to exist in a crystalline state at 20° C. and atmospheric temperature.

The term "crystalline" or "crystallised" means that a material is in a crystalline state at 20° C. and atmospheric pressure.

Particle size distributions as mentioned herein may suitably be determined by means of laser diffraction (Malvern).

The X-ray diffraction pattern of a co-crystal of malic acid and sodium hydrogen malate, identified as sodium trihydrogen dimalate ($Na^+(C_4H_5O_5)^-·C_4H_6O_5$.), is shown in FIG. 1.

The particulate composition of the present invention is particularly suited for application in or onto confectionery products because of its stability, the instantaneous smooth tart taste provided by the malate particles and because it can be provided in the form of a very fine powder (very relevant for e.g. hard panning).

The particulate composition preferably has a volume weighted average diameter $D_{4,3}$ of 40-170 μm, most preferably of 80-160 μm.

Preferably, the malate particles in the particulate composition have a volume weighted average diameter $D_{4,3}$ of 20-180 μm, more preferably of 40-170 μm, most preferably of 80-160 μm.

According to a preferred embodiment, the particulate composition has the following particle size distribution:

$D_{10} \geq 1$ μm;
    40 μm $\leq D_{50} \leq 200$ μm;
    $D_{90} \leq 320$ μm;

wherein the vol. % of particles with diameters smaller than $D_x$ equals x vol. % and wherein the vol. % of particles with diameters larger than $D_x$ equals (100−x) vol. %. Even more preferably, the particulate composition has the following particle size distribution:

$D_{10} \geq 5$ μm;
    60 μm $\leq D_{50} \leq 140$ μm;
    $D_{90} \leq 280$ μm.

The particles in the particulate composition preferably have a span $(D_{90}-D_{10})/D_{50}$ that does not exceed 3.5, more preferably a span that does not exceed 3.0.

The malate particles in the particulate composition preferably contain at least 80 wt. %, more preferably at least 90 wt. %, and most preferably at least 95 wt. % of the co-crystal of malic acid and alkali metal hydrogen malate.

Besides malate particles the particulate composition of the present invention may comprise other particulate components, such as sugar, salt or acid powders.

In a preferred embodiment of the invention, the malate particles represent the bulk of the particulate composition. Accordingly, the particulate composition preferably comprises at least 70 wt. %, more preferably at least 80 wt. %, most preferably at least 90 wt. % of the malate particles.

The water content of the particulate composition typically does not exceed 5 wt. %, more preferably the water content does not exceed 3 wt. %.

According to a particularly preferred embodiment, the co-crystal of malic acid and alkali metal hydrogen malate is a co-crystal of malic acid and sodium hydrogen malate or a co-crystal of malic acid and potassium hydrogen malate. Even more preferably, the co-crystal is sodium trihydrogen dimalate ($Na^+(C_4H_5O_5)^-\cdot C_4H_6O_5$) or dipotassium tetrahydrogen trimalate ($2[K^+(C_4H_5O_5)^-]\cdot C_4H_6O_5$). Most preferably, the co-crystal employed in accordance with the present invention is sodium trihydrogen dimalate ($Na^+(C_4H_5O_5)^-\cdot C_4H_6O_5$).

Yet another aspect of the invention relates to a method of preparing a pulverised malate powder, said method comprising:

providing a coarse malate powder containing at least 90 wt. % of malate particles comprising at least 70 wt. % of co-crystal of malic acid and alkali metal hydrogen malate, said coarse malate powder having a volume weighted average diameter $D_{4,3}$ of at least 100 μm;

reducing the particle size of the coarse malate powder to produce a pulverised malate powder having a volume weighted average diameter D4,3 that is at least 50% lower than that of the coarse malate powder.

Preferably, the malate particles in the coarse malate powder have a volume weighted average diameter $D_{4,3}$ of at least 200 μm, most preferably of 250-600 μm.

The malate particles of the coarse malate powder preferably contain at least 80 wt. %, more preferably at least 90 wt. %, and most preferably at least 95 wt. % of the co-crystal of malic acid and alkali metal hydrogen malate.

The water content of the malate particles in the coarse malate powder preferably does not exceed 5 wt. %, more preferably the water content does not exceed 3 wt. %.

According to a particularly preferred embodiment, the co-crystal of malic acid and alkali metal hydrogen malate in the coarse malate powder is a co-crystal of malic acid and sodium hydrogen malate or a co-crystal of malic acid and potassium hydrogen malate. Even more preferably, the co-crystal is sodium trihydrogen dimalate ($Na^+(C_4H_5O_5)^-\cdot C_4H_6O_5$) or dipotassium tetrahydrogen trimalate ($2[K^+(C_4H_5O_5)^-]\cdot C_4H_6O_5$). Most preferably, the co-crystal employed in accordance with the present invention is sodium trihydrogen dimalate ($Na^+(C_4H_5O_5)^-\cdot C_4H_6O_5$).

Preferably, the present method yields a pulverised malate powder having a volume weighted average diameter $D_{4,3}$ of 20-180 μm, more preferably of 40-170 μm, most preferably of 70-160 μm.

According to another preferred embodiment the method yields a pulverised malate powder having the following particle size distribution:

$D_{10} \geq 1$ μm;

40 μm$\leq D_{50} \leq$200 μm;

$D_{90} \leq$300 μm;

wherein the vol. % of particles with diameters smaller than $D_x$ equals x vol. % and wherein the vol. % of particles with diameters larger than $D_x$ equals (100–x) vol. %.

In one embodiment of the present method the coarse malate powder is prepared by:

providing seed crystal particles containing at least 80 wt. % of crystalline material selected from crystalline organic acid, crystalline salt of organic acid and combinations thereof;

providing an aqueous malate solution, said solution containing sodium and malate in a molar ratio of 4:10 to 6:10 or containing potassium and malate in a molar ratio of 5.5:10 to 7.5:10;

spraying the aqueous malate solution onto the seed crystal particles to produce coated particles;

removing water from the coated particles.

The crystalline material in the seed crystal particles preferably is selected from crystalline organic acid, crystalline salt of organic acid and combinations thereof, wherein the organic acid is selected from malic acid, lactic acid, acetic acid, citric acid, fumaric acid, adipic acid, tartaric acid and combinations thereof. More preferably, the crystalline material is selected from crystalline malic acid, crystalline salt of malic acid and combinations thereof. Even more preferably, the crystalline material is co-crystal of malic acid and sodium hydrogen malate ($Na^+(C_4H_5O_5)^-\cdot C_4H_6O_5$) or co-crystal of malic acid and potassium hydrogen malate ($2[K^+(C_4H_5O_5)^-]\cdot C_4H_6O_5$). Most preferably, the crystalline material is co-crystal of malic acid and sodium hydrogen malate ($Na^+(C_4H_5O_5)^-\cdot C_4H_6O_5$).

The aqueous malate solution that is sprayed onto the particles preferably contains malate in a concentration of at least 1 mol/L, more preferably of at least 1.5 mol/L, most preferably of 2-5 mol/L The aqueous malate solution preferably has a dry matter content of 20-70 wt. %, more preferably of 25-65 wt. % and most preferably of 30-60 wt. %.

The aqueous malate solution is preferably prepared from malic acid by dissolving malic acid in water and adding a neutralizing agent thereto. More preferably, a fully neutralized sodium malate solution is prepared by dissolving malic acid in water and adding a neutralizing agent thereto, and which is mixed with a solution of malic acid in water such that the desired ratio of sodium and malate or potassium and malate is obtained.

The seed crystal particles preferably are employed in the present method in an amount that represents 3-70%, more preferably 5-60%, even more preferably 9-50% by weight of the coated particles obtained after removal of the water.

The aqueous malate solution is preferably sprayed onto a fluidised bed of the seed crystal particles. The bed temperature of this fluidised bed preferably is in the range of 40-100° C., more preferably in the range of 42-90° C., even more preferably in the range of 44-80° C., most preferably in the range of 45-70° C.

Besides water, malate and sodium or potassium cations, the aqueous malate solution preferably contains no other components in a concentration of more than 0.1 wt. %.

The aqueous malate solution may be prepared by dissolving malic acid and either sodium hydrogen malate or potassium hydrogen malate in water. Alternatively, the aqueous malate solution may be prepared by dissolving malic acid and either sodium hydroxide or potassium hydroxide in water. Another alternative is to prepare the aqueous malate solution by dissolving malic acid and either disodium malate or dipotassium malate.

According to a particularly preferred embodiment of the method, spraying of the aqueous malate solution and removal of water from the coated particles are carried out simultaneously.

In a preferred embodiment of the present method, the spraying and water removal are carried out in a fluidized bed dryer. In another preferred embodiment, the spraying and water removal are carried out in a co-current spray dryer with fines recycle to the spraying nozzle (to act as seed crystals).

In an alternative embodiment of the present invention the coarse malate powder is prepared by:

providing malic acid particles containing at least 80 wt. % of malic acid;

providing sodium hydrogen malate particles containing at least 80 wt. % of sodium hydrogen malate or potassium hydrogen malate particles containing at least 80 wt. % of potassium hydrogen malate;

combining 100 parts by weight of the malic acid particles with either 100-138 parts by weight of the sodium hydrogen malate particles or 200-300 parts by weight of potassium hydrogen malate; and 1-10 parts by weight of water;

subjecting the resulting combination to mechanical shear.

A further aspect of the invention relates to a confectionery product comprising at least one of:

a hard panned or soft panned coating containing 0.1-6 wt. % of malate particles;

a tabletted candy containing at least 0.1-50 wt. % of malate particles;

chocolate containing at least 0.1-30 wt. % of malate particles;

wherein the malate particles contain at least 70 wt. % of co-crystal of malic acid and alkali metal hydrogen malate.

The confectionery product of the present invention preferably has a weight in the range of 0.2-500 g, more preferably of 0.4-400 g, most preferably of 0.5-350 g.

The hard panned or soft panned coating of the confectionery product preferably contains 0.5-5.0 wt. %, more preferably 1.0-4.5 wt. % and most preferably 2.0-4.0 wt. % of the malate particles.

The tabletted candy of the confectionery product preferably contains 0.2-45 wt. %, more preferably 0.5-40 wt. % and most preferably 1.0-30 wt. % of the malate particles.

The chocolate component of the confectionery product preferably contains 0.2-25 wt. %, more preferably 0.5-20 wt. % and most preferably 1.0-15 wt. % of the malate particles.

The malate particles that are contained in the coating, tabletted candy or chocolate preferably have a volume weighted average diameter $D_{4,3}$ of 20-180 μm. More preferably, these malate particles have a volume weighted average diameter $D_{4,3}$ of 50-170 μm, most preferably of 80-160 μm.

According to a preferred embodiment, the malate particles have the following particle size distribution:

$D_{10} \geq 1$ μm;

$40$ μm$\leq D_{50} \leq 200$ μm;

$D_{90} \leq 320$ μm;

wherein the vol. % of particles with diameters smaller than $D_x$ equals x vol. % and wherein the vol. % of particles with diameters larger than $D_x$ equals (100-x) vol. %. Even more preferably, malate particles have the following particle size distribution:

$D_{10} \geq 5$ μm;

$60$ μm$\leq D_{50} \leq 140$ μm;

$D_{90} \leq 280$ μm.

The malate particles preferably contain at least 80 wt. %, more preferably at least 90 wt. %, and most preferably at least 95 wt. % of the co-crystal of malic acid and alkali metal hydrogen malate.

According to a preferred embodiment, the co-crystal of malic acid and alkali metal hydrogen malate is sodium trihydrogen dimalate represented by formula $Na^+(C_4H_5O_5)^- \cdot C_4H_6O_5$ or dipotassium tetrahydrogen tri-malate represented by formula $2[K^+(C_4H_5O_5)^-] \cdot C_4H_6O_5$. Most preferably, the co-crystal is sodium trihydrogen dimalate represented by formula $Na^+(C_4H_5O_5)^- \cdot C_4H_6O_5$.

The confectionery product of the present invention preferably comprises an edible core coated with a hard panned coating, said hard panned coating containing at least 50 wt. % of crystallised sweetener selected from crystallised sugars, crystallised sugar alcohols and combinations thereof, said hard panned coating further containing at least 0.1 wt. % of co-crystal of malic acid and alkali metal hydrogen malate.

Preferably, the hard panned coating has an average thickness of 0.1-5 millimeters, more preferably of 0.2-3 millimeters and most preferably of 0.3-2.5 millimeters.

The hard panned coating of the present invention typically contain 10-300 coating layers, more preferably 20-100 coating layers and most preferably 30-60 coating layers.

Preferably, the panned coating contains at least 70 wt. %, more preferably at least 80 wt. % and most preferably at least 90 wt. % of the crystallised sweetener The one or more sugars that are applied as the crystallised sugar in the hard panned coating is preferably selected from sucrose, glucose, fructose, galactose and combinations thereof. Most preferably, said sugar is selected from sucrose, glucose, fructose and combinations thereof.

The one or more sugar alcohols that are applied as the crystallised sugar alcohol is preferably selected from sorbitol, maltitol, xylitol, isomalt, lactitol, mannitol and combinations thereof. Most preferably, the sugar alcohol is selected from xylitol, mannitol, isomalt and combinations thereof.

According to a particularly preferred embodiment, the crystallised sweetener is selected from sucrose, glucose, fructose and combinations thereof.

Another aspect of the invention relates to a process of preparing a hard panned confection, said process comprising:

providing a cohesive edible core;

applying at least one coating layer of syrup onto said edible core, said syrup comprising crystallisable sweetener selected from crystallisable sugars, crystallisable sugar alcohols and combinations thereof; and applying at least one other coating layer comprising malate particles containing at least 70 wt. % of co-crystal of malic acid and alkali metal hydrogen malate.

The cohesive edible core typically has a weight in the range of 0.2-400 g, more preferably of 0.3-250 g.

The syrup that is employed preferably contains 60-80 wt. % of the crystallisable sweetener, more preferably 65-78 wt. % of the crystallisable sweetener.

The water content of the syrup is preferably in the range of 20-40 wt. %, more preferably in the range of 22-35 wt. %.

Together, the sweetener and water preferably constitute 80-100 wt. %, more preferably 90-100 wt. % of the syrup.

The crystallisable sugar is preferably selected from sucrose, glucose, fructose, galactose and combinations thereof. Most preferably, the crystallisable sugar is selected from sucrose, glucose, fructose and combinations thereof.

The crystallisable sugar alcohol is preferably selected from sorbitol, maltitol, xylitol, isomalt, lactitol, mannitol and combinations thereof. Most preferably, the sugar alcohol is selected from xylitol, mannitol, isomalt and combinations thereof.

According to a particularly preferred embodiment, the crystallisable sweetener is selected from sucrose, glucose, fructose and combinations thereof.

According to a particularly preferred embodiment, the malate particles employed in the process of preparing a hard panned confection are applied in the form of a particulate composition as specified herein before.

The water content of the malate particles typically does not exceed 5 wt. %, more preferably the water content does not exceed 3 wt. %.

In a preferred embodiment, the malate particles contain at least 80 wt. %, more preferably at least 90 wt. %, most preferably at least 95 wt. % of the co-crystal of malic acid and alkali metal hydrogen malate.

The co-crystal of malic acid and alkali metal hydrogen malate in the malate particles preferably is a co-crystal of malic acid and sodium hydrogen malate or a co-crystal of malic acid and potassium hydrogen malate. Even more preferably, the co-crystal is sodium trihydrogen dimalate $(Na^+(C_4H_5O_5)^-\cdot C_4H_6O_5)$ or dipotassium tetrahydrogen trimalate $(2[K^+(C_4H_5O_5)^-]\cdot C_4H_6O_5)$. Most preferably, the co-crystal employed in accordance with the present invention is sodium trihydrogen dimalate $(Na^+(C_4H_5O_5)^-\cdot C_4H_6O_5)$.

The invention is further illustrated by the following non-limiting examples.

EXAMPLES

Example 1

Powders containing co-crystal of sodium hydrogen malate and malic acid $(Na^+(C_4H_5O_5)^-\cdot C_4H_6O_5)$, hereinafter referred to as crystalline MASHM, were produced using a batch fluidized bed granulator on lab scale.

First, seed crystals of MASHM were produced by crystallization from an aqueous solution containing equimolar amounts of sodium hydrogen malate and malic acid, and subsequent milling to a mass weighted average diameter of about 200 µm. Three different seed crystal compositions were prepared. One seed crystal composition consisted of MASHM crystals (Composition 1). Two seed crystal compositions (Compositions 2 and 3) were prepared by mixing the MASHM crystals with malic acid particles in the ratios shown in Table 1.

In addition, an aqueous spraying solution was prepared, containing 1304 mM of $C_4H_5NaO_5$ and 1304 mM of $C_4H_6O_5$.

TABLE 1

| Seeding composition | MASHM [wt %] | MA [wt %] |
|---|---|---|
| 1 | 100 | 0 |
| 2 | 70 | 30 |
| 3 | 40 | 60 |

Next, the granulator was charged with the seed crystals to produce a fluidized bed of seed crystals that was heated up to 55° C. When the desired bed temperature had been reached, spraying of the aqueous spraying solution was started. During spraying bed temperature was maintained at 55° C. The total amount of aqueous spraying solution that was sprayed onto the bed of seed crystals was 3.18 mL/g in case of seeding composition 1 and 4.46 mL/g in case of seeding compositions 2 and 3.

After the spraying had ended, the powders were discharged from the granulator. The powders had a mass weighted average diameter of about 300 µm.

Another powder was produced by dry blending the MASHM powder and malic acid powder in a weight ratio of 85:15 (Powder 4).

The compositions of the 4 powders so prepared and of a reference consisting of a commercially available malic acid powder (PURAC® Powder MA—malic acid particles coated with sodium hydrogen malate) are shown in Table 2.

TABLE 2

| | In wt. % | | | |
|---|---|---|---|---|
| | MASHM | $C_4H_6O_5$ | $C_4H_5NaO_5$ | Moisture |
| Powder 1 | 99.7 | | | 0.3 |
| Powder 2 | 89.5 | 10 | | 0.5 |
| Powder 3 | 79.5 | 20 | | 0.5 |
| Powder 4 | 84.7 | 15 | | 0.3 |
| Reference | | 50-58 | 42-50 | ≤2 |

MASHM content of the samples was checked by means of DSC analyses. DSC analyses show endothermic and exothermic phase transitions in sample while it is being heated. The melting peaks of MASHM and malic acid are known. The area under the peak is correlated to the amount of the material and is compared with area under the melting peak of pure MASHM sample (confirmed with X-ray analyzes). The composition is then confirmed through mass balance or Na, K content analyses. This way it was confirmed that the powders 1, 2, 3 and 4 were fully crystallized into MASHM.

The hygroscopicity of these five powders was determined at 30° C. and a relative humidity of 75%. The results are shown in Table 3.

TABLE 3

| | Water uptake after 14 days (wt. %) |
|---|---|
| Powder 1 | 0.0 |
| Powder 2 | 6.8 |
| Powder 3 | 11.5 |
| Powder 4 | 10.6 |
| Reference | 14.1 |

The result for Powder 1 is in line with the result of dynamic vapor sorption tests of this material which showed hardly any change in mass of the product after an adsorption run from 0-90% humidity, indicating that the material is non-hygroscopic.

Example 2

A jacketed, glass vessel of 100 ml was charged with 51.36 g (0.383 mol) of DL-malic acid and 30.17 g of demineralised water. The vessel was connected to a circulating thermostatic bath and heated to 55° C. while being stirred by a magnetic stirrer until the malic acid crystals had fully dissolved. Next, potassium hydroxide 50% (9.37 g, 0.083 mol) was added. The temperature rose to 67° C. and a clear, yellow solution was obtained. The solution was allowed to cool to room temperature, while stirring.

In order to obtain seed crystals, a small amount of the liquid was transferred to an open aluminium cup and allowed to concentrate at ambient temperature by slow evaporation of water. After two weeks all of the water present had evaporated and a crystalline product had formed.

A small piece of this crystalline material was used a seed in the rest of the liquid (now in a glass bottle). After one weekend a slightly turbid solution was formed, containing small crystals.

Analysis of the crystals showed that these crystals consisted of bis(potassium hydrogen DL-malate)·malic acid.

Example 3

A jacketed, glass vessel of 100 ml was charged with 51.26 g (0.382 mol) of DL-malic acid, 15.50 g of demineralised water and 9.39 g potassium hydroxide 50% (0.084 mol). The vessel was connected to a circulating thermostatic bath and heated to 40° C. while being stirred by a magnetic stirrer until the malic acid was fully dissolved. Next, the solution was slowly cooled. At 30° C. some crystal slurry obtained from Example 1 was added as seed crystals. Further cooling to 21.5° C. did not result in much crystal formation. After one night a viscous slurry was formed containing needle/rod-like crystals.

After another 3 days of slow stirring, the slurry was filtered (200 mbar) on a 55 mm paper filter. Filtration time was about 5 minutes. No washing was applied.

The crystal cake (8.38 g) was dried for 2.5 hours at room temperature and a pressure of less than 10 mbar. The dried product (7.49 g) was grinded in a mortar and pestle.

Analysis of the crystals showed that they consisted of bis(potassium hydrogen DL-malate)·malic acid.

Dynamic vapor sorption tests of this crystalline material revealed that the material was stable at a humidity of up to 70%, but started to pick up moisture at higher levels of humidity.

Example 4

Crystalline MASHM was produced on plant scale using a batch fluidized bed granulator as described in Example 1. Next, the powder so obtained was milled in a pen mill.

The pen mill had 480 pins with a metal rib. The mill itself was cooled with nitrogen. The crystalline MASHM powder was introduced into the mill via a bag discharge station, a vacuum transport and a transport screw and milled.

The mill settings used are shown in Table 4.

TABLE 4

| Rotation speed | 3,000 rpm |
| Addition of nitrogen | 30% |
| Throughput | 500 kg/h |

The particle size distribution of the free flowing milled powder was as follows:

98%<150 μm
90%<100 μm

In total 1140 kg of milled powder was produced and packed in 20 kg bag in box.

Example 5

Crystalline MASHM was produced on plant scale using a batch fluidized bed granulator as described in Example 1. Almost 100 wt. % of the powder so obtained had a particle size in the range of 180 to μm (determined by sieves). Next, the MASHM powder was milled in a Hosokawa UPZ 160 fine impact mill, using a pin disc grinding unit.

The mill settings used are shown in Table 5.

TABLE 5

| Rotation speed | 3,000 rpm |
| Frequency | 100% |
| Throughput | 30 kg/h |

The characteristics of the free flowing milled powder so obtained are shown in Table 6.

TABLE 6

| Aerated density (g/mL) | 0.787 |
| Tapped density (g/mL) | 1.033 |
| $D_{10}$ (μm) [1] | 13 |
| $D_{50}$ (μm) [1] | 86 |
| $D_{90}$ (μm) [1] | 263 |
| $D_{3,2}$ (μm) [1] | 19 |
| $D_{4,3}$ (μm) [1] | 137 |
| Dynamic Vapour Sorption 20° C./90% RH | ≤2% moisture uptake |
| Differential Scanning Calorimetry | $T_{melt}$: 158/160° C. |

[1] Malvern Mastersizer 3000 0.5 bar

The milled powder was also sieved over 3 sieve sizes to determine the particle size distribution. The result is shown in Table 7.

TABLE 7

| | Wt. % |
| --- | --- |
| >710 μm | 0.06 |
| 180-710 μm | 10.44 |
| 106-180 μm | 26.37 |
| <106 μm | 63.13 |

After 1 week storage at 40° C./75% RH, the milled powder still was found to be easy flowing.

Example 6

The milled MASHM powder of Example 5 was used to prepare hard panned chewing gums.

An enclosed rotating pan system with 1200 mm of internal diameter was used. 35 kg of chewing gum centres (0.9 g) were placed inside the tulip shaped rotating pan. The pre-made engrossing syrup contained 68 wt. % of a combination of mannitol and xylitol, 28 wt. % water, 3 wt. % gum Arabic and 1 wt. % titanium dioxide. The engrossing syrup was placed in a buffer tank from which the syrup could be pumped through a nozzle into the rotating pan. The syrup was kept at 75-80° C.

The chewing gum centres were coated by applying 17 'coats', each coat comprising 1-5 coating layers. The process details are shown in Table 8.

TABLE 8

| | Coat no. | | | | | | | | |
| --- | --- | --- | --- | --- | --- | --- | --- | --- | --- |
| | 1 | 2 | 3 | 4 | 5 | 6 | 7 | 8 | 9 |
| Number of layers | 2 | 2 | 3 | 3 | 1 | 1 | 2 | 1 | 2 |
| Syrup (mL) | 200 | 250 | 300 | 300 | 325 | 200 | 250 | 200 | 200 |
| Aroma (mL) | | | | | | 20 | | | 50 |
| Milled powder (mL) | | | | | | | | 50 | |
| Glaze (mL) | | | | | | | | | |
| Distribution time (sec.) | 30 | 28 | 30 | 30 | 30 | 30 | 30 | 60 | 60 |
| Drying time (sec.) | 270 | 270 | 270 | 220 | 270 | 220 | 240 | 250 | 320 |

TABLE 8-continued

| | Coat no. | | | | | | | |
|---|---|---|---|---|---|---|---|---|
| | 10 | 11 | 12 | 13 | 14 | 15 | 16 | 17 |
| Number of layers | 1 | 1 | 10 | 4 | 1 | 1 | 3 | 1 |
| Syrup (mL) | 250 | 200 | 300 | 250 | 200 | 200 | 300 | |
| Aroma (mL) | | | | | | | | |
| Milled powder (mL) | | 50 | | 50 | | 80 | | |
| Glaze (mL) | | | | | | | | 50 |
| Distribution time (sec.) | 40 | 60 | 35 | 60 | 60 | 60 | 40 | 200 |
| Drying time (sec.) | 260 | 390 | 260 | 210 | 210 | 210 | 200 | 600 |

The chewing gums so obtained were stored for 5 months. The chewing gums were evaluated by a panel one week and 5 months after production. The product appearance had not significantly changed during these 5 months. After 5 months the chewing gums were found to have the same level of sourness as one week after production.

Example 7

Candies were prepared using the milled MASHM powder of Example 5 on the basis of the recipes shown in Table 9.

TABLE 9

| | Wt. % | | | |
|---|---|---|---|---|
| | 1 | 2 | 3 | A |
| Granulated sugar [1] | | 93.8 | 96.3 | 97.1 |
| Magnesium stearate | 1.0 | 1.0 | 1.0 | 1.0 |
| Strawberry flavour | | 0.17 | 0.17 | 0.17 |
| Milled MASHM powder | 99.0 | 5.0 | 2.5 | |
| Sieved malic acid | | | | 1.75 |

[1] Contains 7.5 wt. % gelatin (mass weighted average diameter appr. 300 μm)

The candies were prepared by mixing the above mentioned ingredients, followed by pressing the resulting mixture into tablets in a FETTE tablet press.

Hygroscopicity of the tablets was determined at different temperatures and humidities. The results are shown in Table 10.

TABLE 10

| | Maximum moisture uptake (wt. %) | | | |
|---|---|---|---|---|
| | 1 | 2 | 3 | A |
| 25° C., 60% RH | 0.0 | 0.1 | 0.2 | 0.3 |
| 30° C., 75% RH | 0.2 | 0.6 | 0.9 | 2.6 |
| 40° C., 75% RH | 0.4 | 39.8 | 27.2 | 36.8 |

The invention claimed is:

1. A particulate composition having a volume weighted average diameter $D_{4,3}$ of 20-180 μm and comprising at least 50 wt. % of malate particles comprising at least 70 wt. % of co-crystal of malic acid and alkali metal hydrogen malate.

2. The particulate composition according to claim 1, wherein the particles of the particulate composition have the following particle size distribution:
(i) $D_{10} \geq 1$ μm;
(ii) 40 μm $\leq D_{50} \leq 200$ μm;
(iii) $D_{90} \leq 320$ μm;
wherein the vol. % of particles with diameters smaller than $D_x$ equals x vol. % and wherein the vol. % of particles with diameters larger than $D_x$ equals (100–x) vol. %.

3. The particulate composition according to claim 1, wherein the malate particles comprise at least 80 wt. % of the co-crystal.

4. The particulate composition according to claim 1, wherein the malate particles comprise at least 90 wt. % of the co-crystal.

5. The particulate composition according to claim 1, wherein the co-crystal is sodium trihydrogen dimalate represented by formula $Na^+(C_4H_5O_5)^- \cdot C_4H_6O_5$ or dipotassium tetrahydrogen trimalate represented by formula $2[K^+ (C_4H_5O_5)^-] \cdot C_4H_6O_5$.

6. The particulate composition according to claim 5, wherein the co-crystal is sodium trihydrogen dimalate represented by formula $Na^+(C_4H_5O_5)^- \cdot C_4H_6O_5$.

7. A method of preparing a particulate composition according to claim 1, the method comprising:
(a) providing a coarse malate powder comprising at least 90 wt. % of malate particles comprising at least 70 wt. % of co-crystal of malic acid and alkali metal hydrogen malate, the coarse malate powder having a volume weighted average diameter $D_{4,3}$ of at least 100 μm; and
(b) reducing the particle size of the coarse malate powder to produce the particulate composition.

8. The method according to claim 7, wherein the coarse malate powder is prepared by:
(a) providing seed crystal particles comprising at least 80 wt. % of crystalline material selected from crystalline organic acid, crystalline salt of organic acid and combinations thereof;
(b) providing an aqueous malate solution, said solution comprising sodium and malate in a molar ratio of 4:10 to 6:10 or comprising potassium and malate in a molar ratio of 5.5:10 to 7.5:10;
(c) spraying the aqueous malate solution onto the seed crystal particles to produce coated particles; and
(d) removing water from the coated particles.

9. A confectionery product, comprising at least one of:
(i) a hard panned or soft panned coating comprising 0.1-6 wt. % of the particulate composition according to claim 1;
(ii) a tabletted candy comprising at least 0.1-50 wt. % of the particulate composition according to claim 1;
(iii) chocolate comprising at least 0.1-30 wt. % of the particulate composition of claim 1.

10. The confectionery product according to claim 9, wherein the particulate composition comprises malate particles comprising at least 80 wt. % of the co-crystal.

11. The confectionery product according to claim 9, wherein the particulate composition comprises malate particles comprising comprise at least 90 wt. % of the co-crystal.

12. The confectionery product according to claim 9, wherein the co-crystal is sodium trihydrogen dimalate represented by formula $Na^+(C_4H_5O_5)^-\cdot C_4H_6O_5$ or dipotassium tetrahydrogen trimalate represented by formula $2[K^+(C_4H_5O_5)^-]\cdot C_4H_6O_5$.

13. The confectionery product according to claim 12, wherein the co-crystal is sodium trihydrogen dimalate represented by formula $Na^+(C_4H_5O_5)^-\cdot C_4H_6O_5$.

14. The confectionery product according to claim 9, wherein the confectionery product comprises an edible core coated with a hard panned coating, the hard panned coating comprising at least 30 wt. % of crystallised sweetener selected from crystallised sugars, crystallised sugar alcohols and combinations thereof, and further comprising at least 0.1 wt. % of co-crystal of malic acid and alkali metal hydrogen malate.

15. A process of preparing a hard panned confection, the process comprising:

(a) providing a cohesive edible core;

(b) applying at least one coating layer of syrup onto the edible core, the syrup comprising crystallisable sweetener selected from crystallisable sugars, crystallisable sugar alcohols and combinations thereof; and (c) applying at least one other coating layer comprising the particulate composition according to claim 1.

* * * * *